United States Patent
Krull et al.

(10) Patent No.: US 8,432,440 B2
(45) Date of Patent: Apr. 30, 2013

(54) SYSTEM AND METHOD FOR ADJUSTING ENGINE PARAMETERS BASED ON FLAME VISUALIZATION

(75) Inventors: Anthony Krull, Anderson, SC (US);
David Leach, Simpsonville, SC (US);
Gilbert Kraemer, Greer, SC (US);
Geoffrey Myers, Simpsonville, SC (US);
Alexey Vert, Schenectady, NY (US);
Garth Frederick, Greenville, SC (US);
Samer Aljabari, Greenville, SC (US)

(73) Assignee: General Electric Company, Schenectady, NY (US)

( * ) Notice: Subject to any disclaimer, the term of this patent is extended or adjusted under 35 U.S.C. 154(b) by 951 days.

(21) Appl. No.: 12/395,525

(22) Filed: Feb. 27, 2009

(65) Prior Publication Data

US 2010/0220182 A1 Sep. 2, 2010

(51) Int. Cl.
*A61B 1/06* (2006.01)

(52) U.S. Cl.
USPC .......................................................... 348/83

(58) Field of Classification Search .................... 348/83; 340/578; 431/12
See application file for complete search history.

(56) References Cited

U.S. PATENT DOCUMENTS

| | | | |
|---|---|---|---|
| 3,739,166 A | 6/1973 | Anderson | |
| 3,969,065 A | 7/1976 | Smialek | |
| 3,969,066 A | 7/1976 | Smialek et al. | |
| 3,990,832 A | 11/1976 | Smialek et al. | |
| 4,101,953 A | 7/1978 | Anderson et al. | |
| 4,105,480 A | 8/1978 | Sterling et al. | |
| 4,118,758 A | 10/1978 | Cusano et al. | |
| 4,128,858 A | 12/1978 | Sterling et al. | |
| 4,299,558 A | 11/1981 | Pinkasovich | |
| 5,125,597 A | 6/1992 | Coffinberry | |
| 5,141,182 A | 8/1992 | Coffinberry | |
| 5,143,329 A | 9/1992 | Coffinberry | |
| 5,275,489 A | 1/1994 | Borneman et al. | |
| 5,674,424 A | 10/1997 | Iben et al. | |
| 5,760,191 A | 6/1998 | Snow et al. | |
| 5,777,668 A * | 7/1998 | Amano | 348/83 |
| 5,859,704 A | 1/1999 | Fric et al. | |
| 6,172,327 B1 | 1/2001 | Aleshin et al. | |
| 6,278,374 B1 * | 8/2001 | Ganeshan | 340/578 |
| 6,326,585 B1 | 12/2001 | Aleshin et al. | |
| 6,414,458 B1 | 7/2002 | Hatley et al. | |
| 6,420,178 B1 | 7/2002 | LaGraff et al. | |
| 6,525,500 B2 | 2/2003 | Hatley et al. | |
| 6,532,840 B2 | 3/2003 | Hatley et al. | |

(Continued)

OTHER PUBLICATIONS

Muruganandam, et al. "Chemiluminescence Based Sensors for Turbine Engines," School of Aerospace Engineering, Georgia Institute of Technology, Atlanta, GA, 39th AIAA/ASME/SAE/ASEE Joint Propulsion Conference & Exhibit, Huntsville, AL, Jul. 20-23, 2003.

(Continued)

*Primary Examiner* — Tammy Nguyen
(74) *Attorney, Agent, or Firm* — Fletcher Yoder, P.C.

(57) ABSTRACT

In one embodiment, a system includes an engine that includes a combustion chamber and a viewing port into the combustion chamber. The engine also includes a camera configured to obtain an image of a flame in the combustion chamber through the viewing port and a controller configured to adjust a parameter of the engine based on the image of the flame.

17 Claims, 12 Drawing Sheets

U.S. PATENT DOCUMENTS

| | | |
|---|---|---|
| 6,605,258 B2 | 8/2003 | LaGraff et al. |
| 6,607,918 B2 | 8/2003 | LaGraff et al. |
| 6,691,019 B2 | 2/2004 | Seeley et al. |
| 6,737,459 B2 | 5/2004 | Ebisawa et al. |
| 6,931,352 B2 | 8/2005 | Cryer et al. |
| 7,099,017 B2 | 8/2006 | Harding et al. |
| 7,219,040 B2 | 5/2007 | Renou et al. |
| 7,266,515 B2 | 9/2007 | Costello et al. |
| 7,271,894 B2 | 9/2007 | Devitt et al. |
| 7,302,990 B2 | 12/2007 | Bunker et al. |
| 7,336,897 B2 | 2/2008 | Williamson |
| 7,360,437 B2 | 4/2008 | Hardwicke et al. |
| 2001/0014436 A1* | 8/2001 | Lemelson et al. ............... 431/12 |
| 2003/0002036 A1* | 1/2003 | Haan et al. ................. 356/241.1 |
| 2005/0266363 A1* | 12/2005 | Ganeshan ........................ 431/79 |
| 2005/0268615 A1 | 12/2005 | Bunker et al. |
| 2006/0088793 A1* | 4/2006 | Brummel et al. ............... 431/13 |
| 2007/0089545 A1 | 4/2007 | Roney, Jr. et al. |
| 2007/0119147 A1 | 5/2007 | Cornwell et al. |
| 2007/0131796 A1 | 6/2007 | Hessler |
| 2008/0000610 A1 | 1/2008 | Bunker et al. |
| 2008/0066676 A1 | 3/2008 | Mariner et al. |
| 2008/0083228 A1 | 4/2008 | Myhre |
| 2008/0144049 A1 | 6/2008 | Ringermacher et al. |
| 2008/0206485 A1 | 8/2008 | Hardwicke et al. |
| 2008/0317090 A1 | 12/2008 | Tralshawala et al. |
| 2009/0289178 A1* | 11/2009 | Haffner ...................... 250/227.2 |
| 2010/0103424 A1* | 4/2010 | Davis et al. .................... 356/402 |
| 2010/0151397 A1* | 6/2010 | Farrell et al. ....................... 431/4 |
| 2011/0011079 A1* | 1/2011 | Kamen et al. .................... 60/520 |
| 2012/0194667 A1* | 8/2012 | Banerjee et al. .............. 348/135 |

OTHER PUBLICATIONS

Prakash, et al., "Acoustic Sensing and Mitigation of Lean Blow Out in Premixed Flames," Georgia Institute of Technolgy, Atlanta, GA, American Institute of Aeronautics and Astronautics, 43rd Aerospace Sciences Meeting, Reno, NV, Jan. 2005.

* cited by examiner

SYSTEM AND METHOD FOR ADJUSTING ENGINE PARAMETERS BASED ON FLAME VISUALIZATION

BACKGROUND OF THE INVENTION

The subject matter disclosed herein relates to a gas turbine engine and, more specifically, to a system and method for adjusting engine parameters based on flame visualization.

In general, gas turbine engines combust a mixture of compressed air and fuel to produce hot combustion gases. Combustion may occur in multiple combustors positioned radially around the longitudinal axis of the gas turbine engine. During turbine operation, anomalies may occur within the combustors that increase emissions of regulated combustion products and/or damage components within the turbine engine. For example, absent flames within the combustor, improper flame temperature, fuel maldistribution and changes to fuel composition may increase emissions. Furthermore, flashback/flame holding events, substantially excessive dynamic oscillations and lean blowout may both increase emissions and potentially damage the combustor and/or turbine engine. In addition, metal particles from a compressor may melt and splatter within the combustor indicating compressor wear and a thermal coating within the combustor may detach. Without proper detection and mitigation of these anomalies, the turbine engine may not meet emissions standards and suffer reduced longevity.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes an engine that includes a combustion chamber and a viewing port into the combustion chamber. The engine also includes a camera configured to obtain an image of a flame in the combustion chamber through the viewing port and a controller configured to adjust a parameter of the engine based on the image of the flame.

In a second embodiment, a system includes a controller configured to receive an image of the interior of a combustion chamber from a camera. The controller is also configured to control a parameter affecting combustion in the combustion chamber based on the image.

In a third embodiment, a method includes obtaining an image of a flame in a combustion chamber from a camera. The method also includes controlling a parameter affecting combustion in the combustion chamber based on the image.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure may enhance turbine system operation by visually identifying and correcting potential anomalies in real time without operator intervention. Certain embodiments may include a visualization system coupled to each combustor within the turbine system. The visualization system may include a viewing port into the combustor, a camera configured to observe the interior of the combustor through the viewing port and a controller configured to receive images from the camera. The camera may monitor various optical spectra emitted by the combustor, such as visible, infrared and ultraviolet. The controller may identify potential anomalies based on an image, or series of images, from the camera. For example, the controller may identify conditions such as flame presence, flame temperature, flashback, substantially excessive dynamic oscillations, fuel maldistribution, changes to fuel composition, lean blow-out precursors, or a combination thereof. The controller, communicatively coupled to fuel nozzles and other turbine system components, may adjust fuel flow, inlet guide vane angle, inlet bleed heat and/or activate a water injection system to compensate for the detected condition. If the condition is not properly resolved, an operator may be notified. In certain embodiments, the camera is coupled to a positioning mechanism configured to translate and/or rotate the camera relative to the viewing port, such that the camera may monitor various regions within the combustor. In further embodiments, fiber optic cables optically couple the camera to the combustor. In such embodiments, the camera may include a multiplexing system to monitor images from multiple fiber optic cables.

Figure 1:
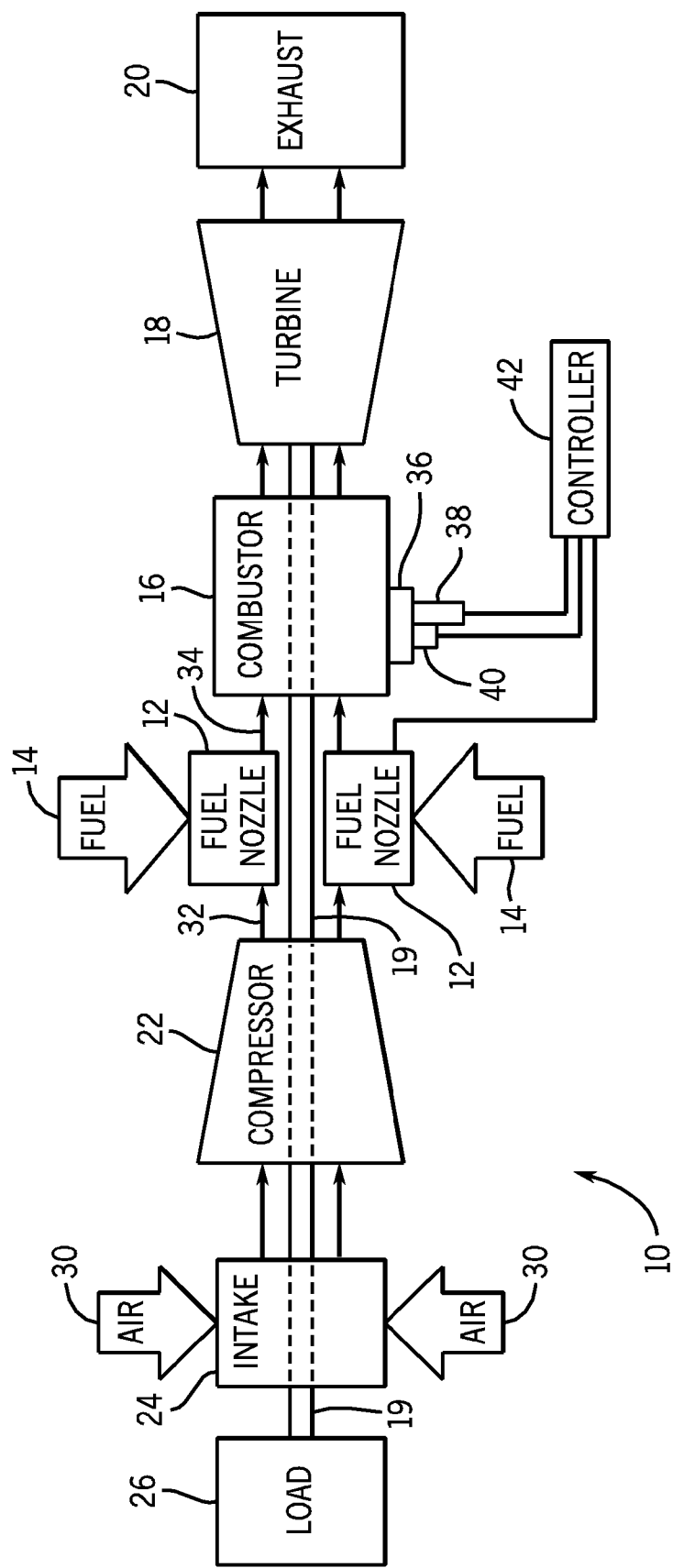
FIG. 1 is a block diagram of a turbine system having a controller configured to adjust a parameter affecting combustion based on an image from a camera optically coupled to a combustor in accordance with certain embodiments of the present technique.

Turning now to the drawings and referring first to FIG. 1, a block diagram of an embodiment of a gas turbine system 10 is illustrated. The diagram includes fuel nozzle 12, fuel supply 14, and combustor 16. As depicted, fuel supply 14 routes a liquid fuel or gas fuel, such as natural gas, to the turbine system 10 through fuel nozzle 12 into combustor 16. The fuel nozzle 12 is configured to inject and mix the fuel with compressed air. The combustor 16 ignites and combusts the fuel-air mixture, and then passes hot pressurized exhaust gas into a turbine 18. The exhaust gas passes through turbine blades in the turbine 18, thereby driving the turbine 18 to rotate. In turn, the coupling between blades in turbine 18 and shaft 19 will cause the rotation of shaft 19, which is also coupled to several components throughout the turbine system 10, as illustrated. Eventually, the exhaust of the combustion process may exit the turbine system 10 via exhaust outlet 20.

In an embodiment of turbine system 10, compressor vanes or blades are included as components of compressor 22. Blades within compressor 22 may be coupled to shaft 19, and will rotate as shaft 19 is driven to rotate by turbine 18. Compressor 22 may intake air to turbine system 10 via air intake 24. Further, shaft 19 may be coupled to load 26, which may be powered via rotation of shaft 19. As appreciated, load 26 may be any suitable device that may generate power via the rotational output of turbine system 10, such as a power generation plant or an external mechanical load. For example, load 26 may include an electrical generator, a propeller of an airplane, and so forth. Air intake 24 draws air 30 into turbine system 10 via a suitable mechanism, such as a cold air intake, for subsequent mixture of air 30 with fuel supply 14 via fuel nozzle 12. As will be discussed in detail below, air 30 taken in by turbine system 10 may be fed and compressed into pressurized air by rotating blades within compressor 22. The pressurized air may then be fed into fuel nozzle 12, as shown by arrow 32. Fuel nozzle 12 may then mix the pressurized air and fuel, shown by numeral 34, to produce an optimal mix ratio for combustion, e.g., a combustion that causes the fuel to more completely burn, so as not to waste fuel or cause excess emissions.

Turbine system 10 also includes a viewing port 36, a camera 38 and a camera positioning mechanism 40 coupled to combustor 16. Camera 38 may be configured to observe various aspects of the combustion process through viewing port 36. For example, camera 38 may monitor visible, infrared and ultraviolet emissions from the interior of combustor 16 to detect various flame anomalies and/or structural defects. Furthermore, camera 38 may be a still camera or a video camera capable of generating a series of images over time. Positioning mechanism 40 is coupled to camera 38 to facilitate rotation and/or translation relative to viewing port 36. In this manner, camera 38 may be positioned to observe various regions of the combustor interior.

A controller 42 is communicatively coupled to camera 38, positioning mechanism 40 and fuel nozzle 12. In certain embodiments, controller 42 may also be communicatively coupled to inlet guide vanes, an inlet bleed heat unit and/or a water injection system. Camera 38 is configured to transmit images of the interior of combustor 16 to controller 42. Controller 42 may, in turn, analyze the images and determine whether combustor 16 is functioning within operational parameters. For example, controller 42 may be configured to detect improper flame temperature, metal splatter, thermal barrier coating (TBC) detachment, flame presence, excessive combustor oscillations, lean blow-out (LBO) precursors, flashback/flame holding, fuel maldistribution, and/or changes to fuel composition, among other combustor conditions. Alternatively, camera 38 may include circuitry configured to detect any of the above conditions and transmit the detected condition to controller 42. Furthermore, controller 42 may be configured to adjust fuel flow, inlet guide vane angle, inlet bleed heat and/or activate a water injection system based on an identified condition. For example, controller 42 may adjust fuel flow into combustor 16 and/or fuel distribution between fuel nozzles 12. In addition, controller 42 may set a warning indicator to inform an operator of a detected condition. Controller 42 may also adjust the position of camera 38 by instructing positioning mechanism 40 to rotate and/or translate camera 38.

Figure 2:
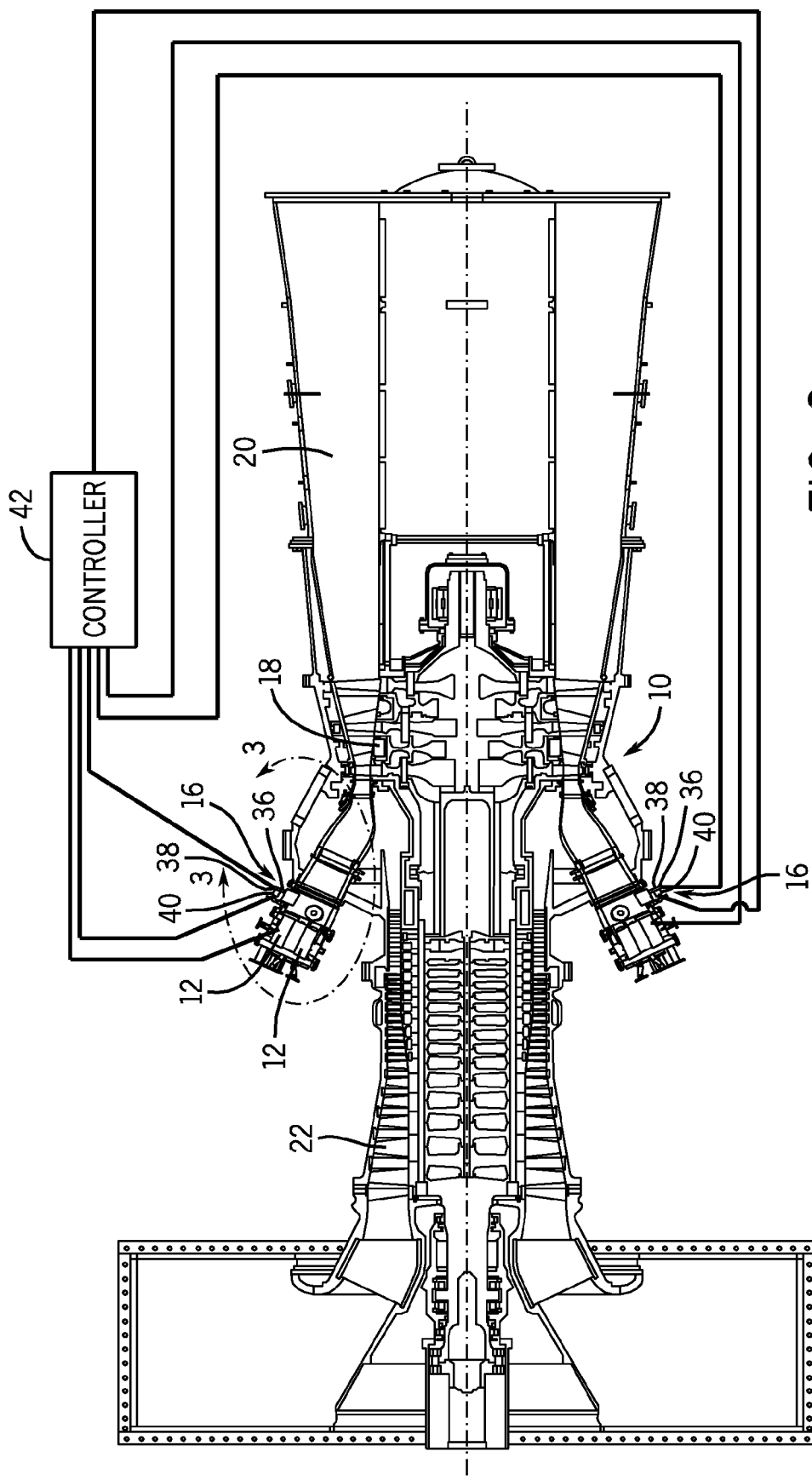
FIG. 2 is a cutaway side view of the turbine system, as shown in FIG. 1, in accordance with certain embodiments of the present technique.

FIG. 2 shows a cutaway side view of an embodiment of turbine system 10. As depicted, the embodiment includes compressor 22, which is coupled to an annular array of combustors 16. For example, six combustors 16 are located in the illustrated turbine system 10. Each combustor 16 includes one or more fuel nozzles 12, which feed an air-fuel mixture to a combustion zone located within each combustor 16. For example, each combustor 16 may include 1, 2, 3, 4, 5, 6, 7, 8, 9, 10, or more fuel nozzles 12 in an annular or other suitable arrangement. Combustion of the air-fuel mixture within combustors 16 will cause vanes or blades within turbine 18 to rotate as exhaust gas passes toward exhaust outlet 20.

FIG. 2 also shows exemplary positions of viewing ports 36, cameras 38 and positioning mechanisms 40 relative to each combustor 16. As illustrated, a glass-type viewing port 36 is coupled to combustor 16. Glass-type viewing ports 36 are composed of a heat resistance transparent material such as fused quartz or synthetic sapphire, among others. Furthermore, in this embodiment, camera 38 is located downstream of fuel nozzles 12, and oriented substantially perpendicular to a flow path of combustion gases. This configuration may enable camera 38 to capture images of flames produced by fuel nozzles 12. Electronic signals indicative of these images may be transmitted to controller 42 for analysis. If controller 42 determines that combustor 16 is not performing within operational parameters, controller 42 may adjust fuel flow to fuel nozzles 12 to compensate. Alternatively, controller 42 may adjust inlet guide vane angle, inlet bleed heat and/or activate a water injection.

In the embodiment depicted in FIG. 2, each combustor 16 includes a single viewing port 36, camera 38 and positioning mechanism 40. Other embodiments may employ multiple cameras 38 per combustor 16. In such embodiments, cameras 38 may be disposed adjacent to each combustor 16 at various locations. For example, cameras 38 may be positioned radially around the circumference and/or along the longitudinal axis of each combustor 16. Because combustors 16 are typically constructed of opaque material (e.g., metal), each camera location may include a viewing port 36 to facilitate monitoring of the combustor interior. Furthermore, the number of cameras 38 and the position of each camera 38 may vary between combustors 16.

Each camera 38 is communicatively coupled to controller 42 and configured to send a signal indicative of a captured image. Controller 42 is configured to analyze these images and detect flame abnormalities and/or structural defects within each combustor 16. Furthermore, in embodiments employing multiple cameras 38 per combustor 16, controller 42 may be configured to create a composite (e.g., 3-dimensional) image of the combustor interior. A composite image may facilitate detection of flame and/or structural irregularities throughout combustor 16. Controller 42 may also be configured to compare images of individual and/or multiple combustor interiors to identify uncharacteristic combustor operation. For example, if the temperature of one flame within a combustor 16 substantially deviates from a combustor average, controller 42 may adjust fuel flow to the anomalous flame to compensate. Similarly, the temperature of each flame may be compared to average flame temperature across the entire turbine system 10. As previously discussed, the turbine system 10 includes multiple combustors 16. By comparing flame temperature across the entire turbine system 10, the controller 42 may identify particular flames that are burning at undesirable temperatures. Alternatively, the controller 42 may contain a database of proper flame temperatures for particular turbine configurations and/or operating conditions. The controller 42 may then adjust fuel flow to individual fuel nozzles 12 if flame temperature substantially deviates from the temperatures stored within this database.

Figure 3:
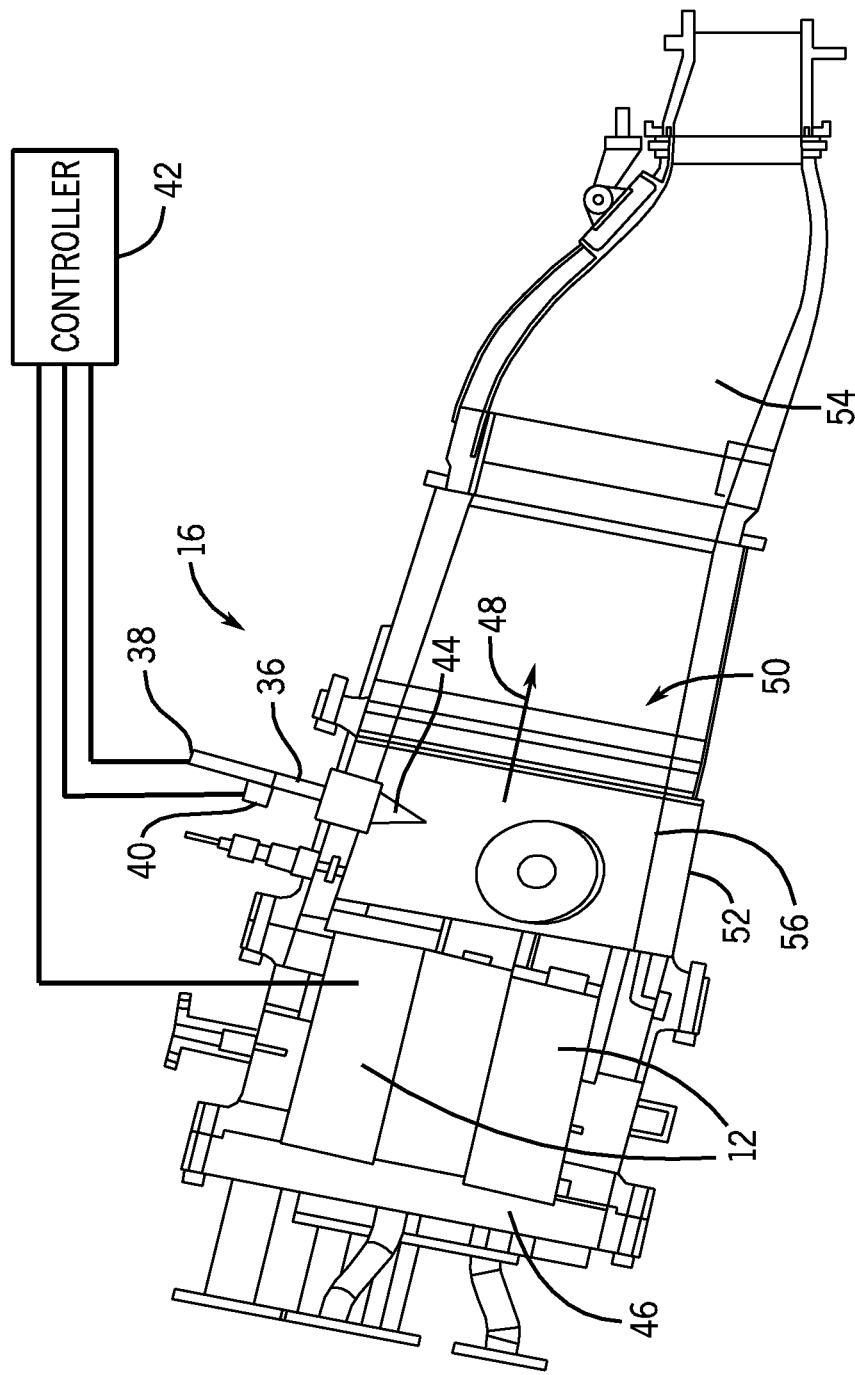
FIG. 3 is a cutaway side view of the combustor, as shown in FIG. 1, with a camera, viewing port and prism coupled to the combustor in accordance with certain embodiments of the present technique.

FIG. 3 is a detailed cutaway side view illustration of an embodiment of combustor 16. This figure shows a detailed view of viewing port 36, camera 38 and positioning mechanism 40. In addition, this embodiment includes a prism 44 coupled to viewing port 36 on an interior side substantially opposite from camera 38. Other optical methods of viewing the combustor interior may be employed in alternative embodiments, such as mirrored surfaces and/or alternative lens designs. As depicted, combustor 16 includes fuel nozzles 12 that are attached to end cover 46 at a base of combustor 16. A typical arrangement of combustor 16 may include five or six fuel nozzles 12. Other embodiments of combustor 16 may use a single large fuel nozzle 12. The surfaces and geometry of fuel nozzles 12 are designed to provide an optimal mixture and flow path for air and fuel as it flows downstream through combustor 16, thereby enabling increased combustion in the chamber, and thus producing more power in the turbine engine. The fuel mixture is expelled from fuel nozzles 12 downstream in direction 48 to a combustion zone 50 inside combustor casing 52. Combustion zone 50 is the location where ignition of the air-fuel mixture is most appropriate within combustor 16. For example, a flame holding or flashback of the fuel upstream, within fuel nozzle 12, may result in premature wear or damage to fuel nozzle 12, combustor 16 and/or turbine 18. In addition, it is generally desirable to combust the air-fuel mixture downstream of the base to reduce the heat transfer from the combustion zone 50 to the fuel nozzles 12. In the illustrated embodiment, combustion zone 50 is located inside combustor casing 52, downstream from fuel nozzles 12 and upstream from a transition piece 54, which directs the pressurized exhaust gas toward turbine 18. Transition piece 54 includes a converging section that enables a velocity increase as the combusted exhaust flows out of combustor 16, producing a greater force to turn turbine 18. In turn, the exhaust gas causes rotation of shaft 19 to drive load 26. In an embodiment, combustor 16 also includes liner 56 located inside casing 52 to provide a hollow annular path for a cooling air flow, which cools the casing 52 around combustion zone 50. Liner 56 also may provide a suitable contour to improve flow from fuel nozzles 12 to turbine 18.

The combustion visualization system depicted in this embodiment includes a sight tube-type viewing port 36. Sight tube viewing port 36 includes a hollow tube that optically couples camera 38 to combustor 16. The length of this tube displaces camera 38 from the hot combustion gasses within combustor 16, thereby protecting sensitive elements of camera 38. The present embodiment also includes the prism 44 coupled to viewing port 36. In this embodiment, positioning mechanism 40 is configured to rotate camera 38, viewing port 36 and prism 44, together. As the elements rotate, prism 44 may enable camera 38 to view different regions of the combustor interior. As appreciated, prism 44 may be coupled to a glass-type viewing port 36 in alternative embodiments.

Figure 4:
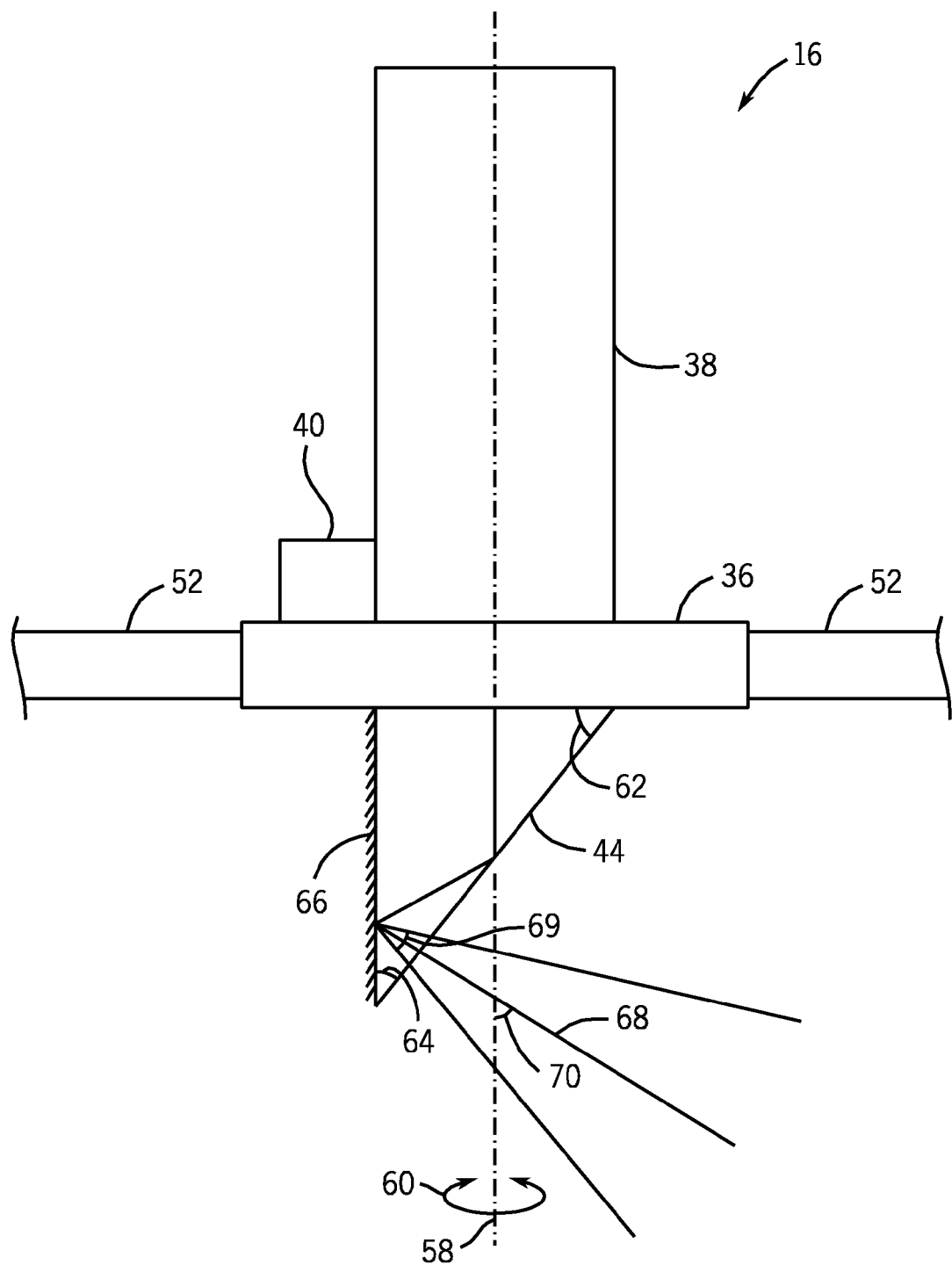
FIG. 4 is a cutaway side view of the camera, viewing port and prism, as shown in FIG. 3, in accordance with certain embodiments of the present technique.

FIG. 4 depicts an embodiment of prism 44 with a triangular configuration including 30 degree, 60 degree and 90 degree angles. This type of prism may be described as a Littrow prism. Prism 44 is coupled to viewing port 36 substantially opposite from camera 38 along axis 58. As the prism 44/camera 38 assembly rotates in a direction 60 about axis 58, camera 38 may observe various regions of combustor 16 without translating. Specifically, prism 44 includes a first angle 62 and a second angle 64. In this embodiment, angle 62 is approximately 60 degrees and angle 64 is approximately 30 degrees. In addition, prism 44 includes a reflective coating 66 disposed on a side opposite angle 62. In this configuration, an exemplary beam of light 68 entering prism 44 at an angle 70 will be reflected by the surfaces of prism 44, as shown in FIG. 4, and enter camera 38. Based on the geometry of the Littrow prism described above, angle 70 is approximately 60 degrees. Therefore, as prism 44 rotates, camera 38 may observe regions of combustor 16 located approximately 60 degrees from axis 58. As appreciated, camera 38 may monitor a region of the combustor interior defined by a viewing angle 69 relative to the exemplary light beam 68. Viewing angle 69 may vary based on camera 38 configuration and optics. For example, viewing angle 69 may be greater than 0 degrees and less than 90 degrees. For example, viewing angle 69 may range between about 0 to 90 degrees, 0 to 60 degrees, 0 to 45 degrees, 0 to 30 degrees, or 0 to 15 degrees. By further example, the angle may be about 5, 10, 15, 20, 25, 30, 35, 40, or 45 degrees, or any angle therebetween. Further embodiments may employ prisms 44 having different geometric configurations to view alternative regions of combustor 16. In addition, certain embodiments may include a retractable and/or removable prism to protect the prism from hot combustion gases when not in use.

Positioning mechanism 40 may be coupled to camera 38, viewing port 36, prism 44, or a combination thereof. For example, in the present embodiment, camera 38, viewing port 36 and prism 44 are secured together to form a single assembly. Furthermore, viewing port 36 is disposed within combustor casing 52 and configured to rotate about axis 58 in direction 60. Positioning mechanism 40 is coupled to viewing port 36 to facilitate rotation about axis 58. In this configuration, rotation of viewing port 36 results in rotation of the assembly, including camera 38 and prism 44. In this manner, the controller may instruct positioning mechanism 40 to rotate such that camera 38 views various regions of the combustor interior through prism 44. In other embodiments, positioning mechanism 40 may rotate camera 38 about alternative axes and/or translate camera 38 relative to viewing port 36.

Figure 5:
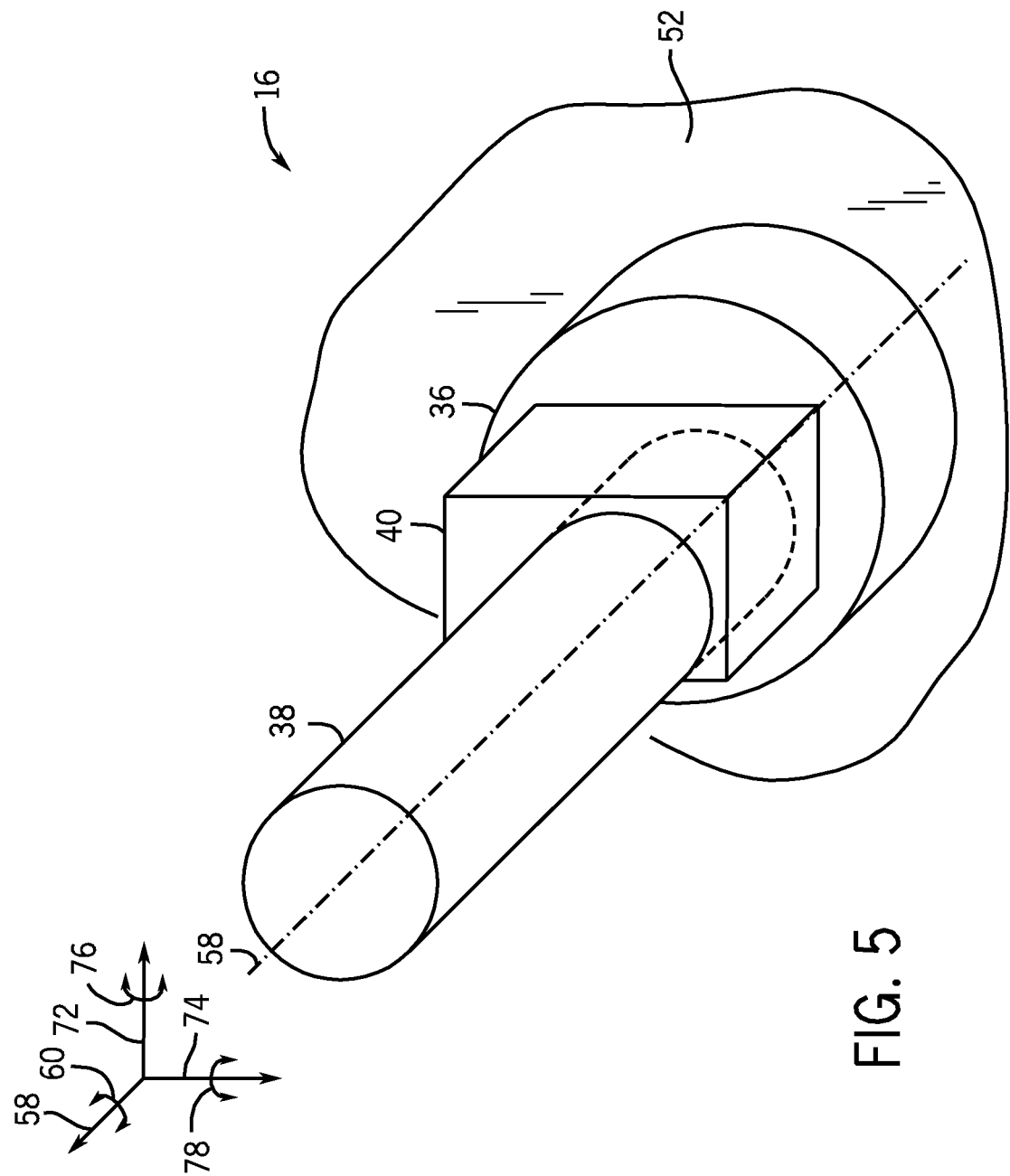
FIG. 5 is a perspective view of the camera and viewing port, as shown in FIG. 4, in accordance with certain embodiments of the present technique.

As seen in FIG. 5, positioning mechanism 40 may be coupled to camera 38 to facilitate rotation about multiple axes. As previously discussed, positioning mechanism 40 may rotate camera 38 about axis 58 in direction 60. However, in embodiments without prism 44, rotation of camera 38 about axis 58 only varies the orientation of the resultant image. Therefore, positioning mechanism 40 may be configured to rotate camera 38 about axes 72 and 74 in directions 76 and 78, respectively. As illustrated, axes 58, 72 and 74 are perpendicular to one another. In this configuration, camera 38 may be directed to various regions of the combustor interior.

Positioning mechanism 40 may include any suitable device capable of rotating camera 38. For example, positioning mechanism 40 may include an electric motor, or series of electric motors, configured to rotate camera 38 about multiple axes. The motor or motors may be connected to a 3-axis gimbaled mount configured to rotate camera 38 about axes 58, 72 and/or 74. In one embodiment, each axis of the gimbaled mount has an independent motor. In alternative embodiments, a single motor is configured to rotate camera 38 about each axis through a series of gears located within the gimbaled mount.

Figure 6:
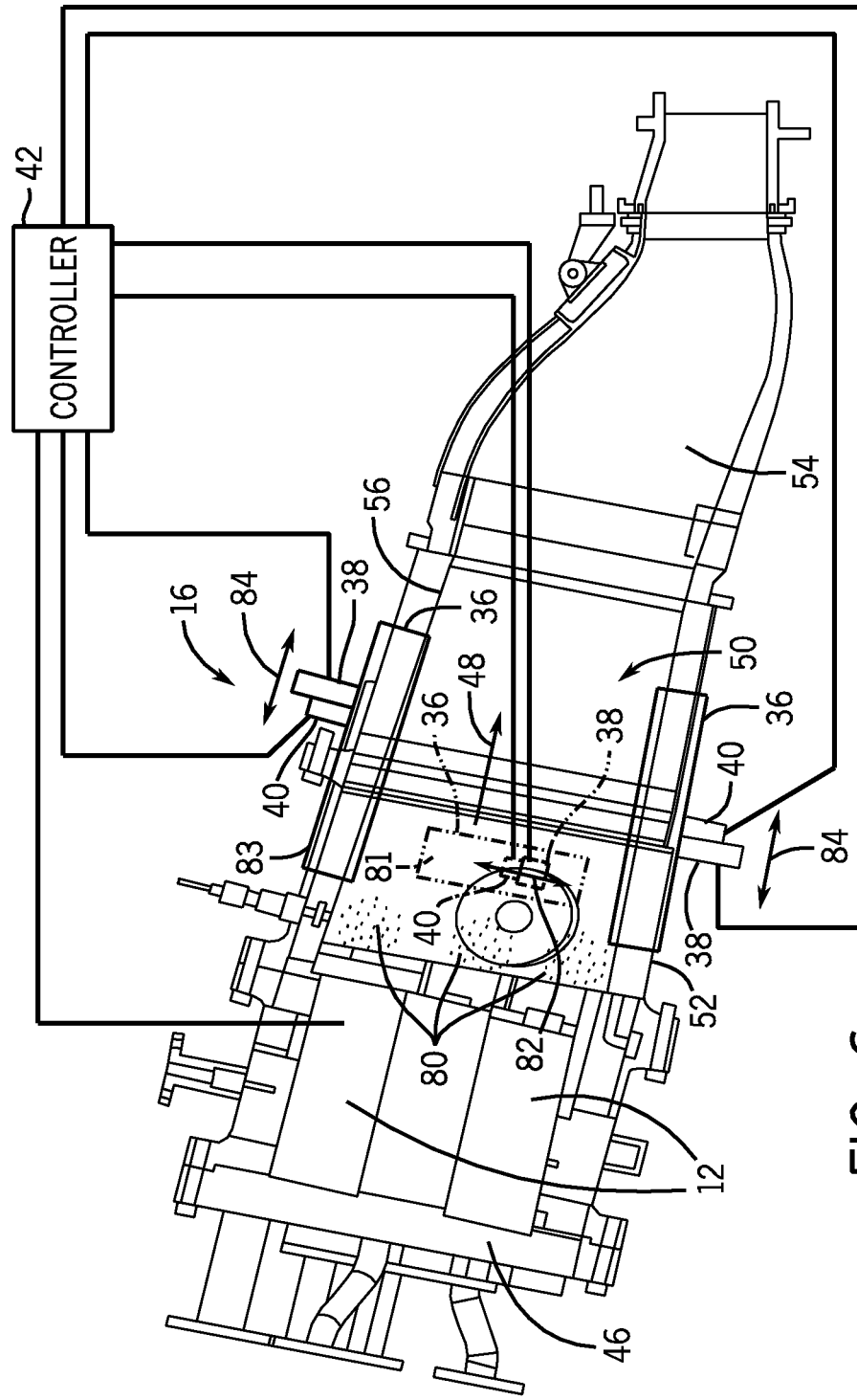
FIG. 6 is a cutaway side view of the combustor, as shown in FIG. 1, with multiple cameras configured to translate along the surface of the combustor in accordance with certain embodiments of the present technique.

The embodiment depicted in FIG. 6 includes multiple cameras 38 located at various positions across the surface of combustor 16. Each camera 38 depicted in this embodiment is configured to translate relative to a respective viewing port 36. Specifically, each viewing port 36 within combustor 16 is substantially rectangular. Alternative embodiments may employ viewing ports 36 having circular, elliptical, triangular, or other shapes. As illustrated, viewing ports 36 may be oriented parallel or perpendicular to direction 48 of combustion gas flow. For example, a perpendicular viewing port 81 is disposed within combustor casing 52 adjacent to flames 80. Positioning mechanism 40 is configured to translate camera 38 in a direction 82 (e.g., circumferentially about the longitudinal axis) along the surface of perpendicular viewing port 81. In this manner, camera 38 may monitor each flame 80 within combustor 16. Furthermore, a parallel viewing port 83 is disposed within combustor casing 52 along the longitudinal axis of combustor 16. Positioning mechanism 40 is configured to translate camera 38 in a direction 84 along the surface of parallel viewing port 83. In this manner, camera 38 may monitor flames 80, located upstream along the longitudinal axis, and combustor liner 56, located downstream along the longitudinal axis.

Positioning mechanism 40 may include an electric motor configured to translate camera 38 along a track substantially parallel to viewing port 36. For example, the electric motor may be disposed to camera 38 and coupled to a pinion gear. A corresponding rack may be positioned along the parallel track. Teeth of the pinion may interlock with teeth of the rack, facilitating translation of camera 38 upon pinion rotation. Other positioning mechanisms (e.g., pneumatic, hydraulic, electromechanical, etc.) capable to translating camera 38 relative to viewing port 36 may be employed in alternative embodiments.

Similarly, viewing port 36 may be square shaped, facilitating multi-axis translation of camera 38. For example, if viewing port 36 is disposed on a side of combustor 16, camera 38 may translate in directions 82 and/or 84. Other viewing port configurations, including circular and polygonal, may be employed in other embodiments. Furthermore, positioning mechanism 40 may be configured to both translate and rotate camera 38 relative to viewing port 36. For example, the rack and pinion system described above may be employed in conjunction with a gimbaled camera mount.

Figure 7:
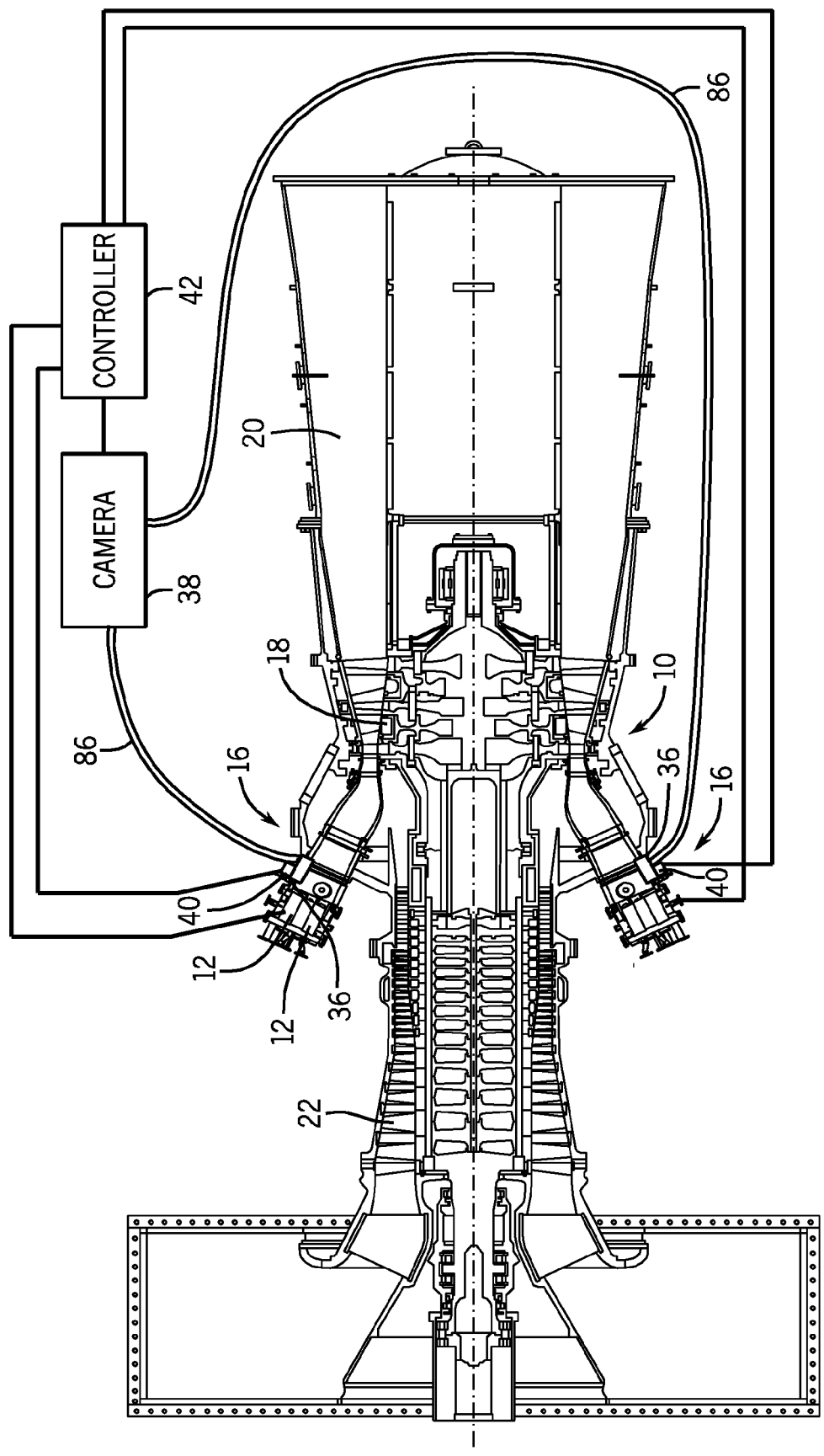
FIG. 7 is a cutaway side view of the turbine system, as shown in FIG. 1, with fiber optic cables linking the camera to the combustors in accordance with certain embodiments of the present technique.

FIG. 7 depicts an alternative embodiment in which fiber optic cables convey images of the combustor interior to camera 38. As illustrated, fiber optic cables 86 optically couple camera 38 to combustors 16. Fiber optic cables 86 may be connected to viewing ports 36, as shown, or directly attached to combustors 16. As previously described, controller 42 is communicatively coupled to camera 38 and fuel nozzles 12. In certain embodiments, controller 42 may also be communicatively coupled to inlet guide vanes, an inlet bleed heat unit and/or a water injection system. Controller 42 is also communicatively coupled to positioning mechanisms 40 configured to facilitate rotation and/or translation of optical fiber ends relative to combustor 16. Furthermore, prisms may be located adjacent to viewing ports 36 such that prism rotation varies the region of fiber optic monitoring. In addition, other embodiments may employ alternative light transmission lines such as photonic-crystal fibers, waveguides and/or light pipes, for example.

Camera 38 may include a multiplexing system to facilitate monitoring of multiple fiber optic cables 86. Images from each fiber optic cable 86 may be multiplexed in space or time. For example, as seen in FIG. 7, two fiber optic cables 86 are optically coupled to camera 38. If the camera is configured to multiplex the images in space, each cable 86 may project an image to a different portion of a camera image sensing device (e.g., charge-coupled device (CCD)). In this configuration, an image from one combustor 16 may be directed to an upper portion of the image sensing device, while an image from the other combustor 16 may be directed to a lower portion of the image sensing device. As a result, the image sensing device may scan each image at half resolution. Similarly, if ten fiber optic cables 86 are coupled to camera 38 via spatial multiplexing, each image may be scanned at a tenth resolution. In other words, scan resolution is inversely proportional to the number of spatially multiplexed signals. As appreciated, lower resolution scans provide controller 42 will less information about the combustor interior than higher resolution scans. Therefore, the number of spatially multiplexed signals may be limited by the minimum resolution sufficient for controller 42 to identify flame anomalies and/or structural defects.

Alternatively, images provided by fiber optic cables 86 may be multiplexed in time. For example, camera 38 (e.g., video camera) may alternately scan an image from each combustor 16 using the entire resolution of the image sensing device. Using this technique, the full resolution of the image sensing device may be utilized, but the scanning frequency may be reduced proportionally to the number of combustors 16 scanned. For example, if ten combustors 16 are scanned and the camera frame rate is 2000 frames per second, camera 38 is only able to scan images from each combustor 16 at 200 frames per second. Therefore, the number of temporally multiplexed signals may be limited by the desired scanning frequency. For example, if controller 42 is configured to identify combustor dynamic oscillations at a frequency of 500 Hz and camera frame rate is 2000 frames per second, a maximum of four images may be temporally multiplexed. Any additional multiplexing may inhibit controller 42 from identifying such dynamic events.

Figure 8:
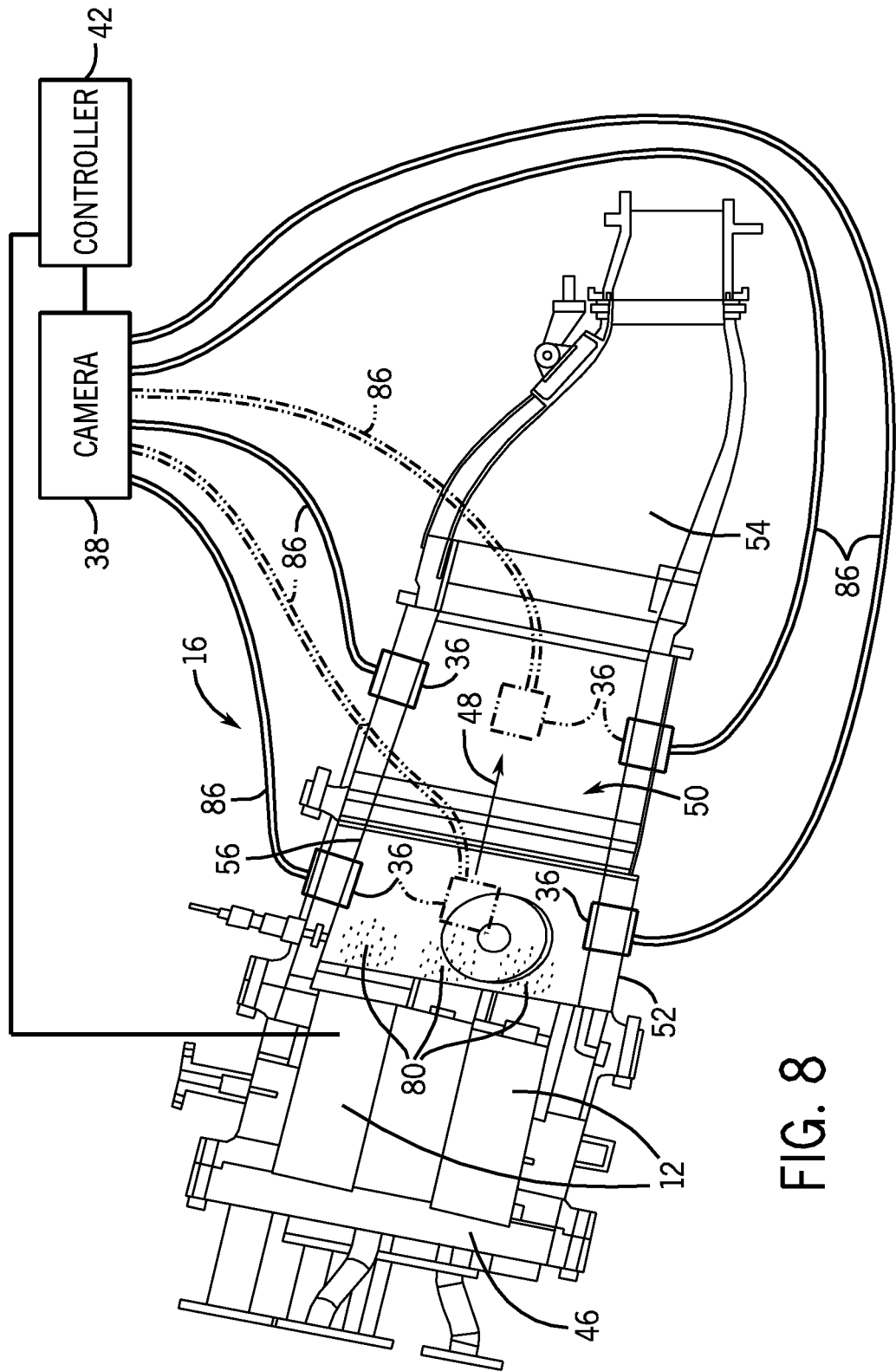
FIG. 8 is a cutaway side view of the combustor, as shown in FIG. 1, with multiple fiber optic cables linking the camera to various regions of the combustor in accordance with certain embodiments of the present technique.

FIG. 8 shows a single camera 38 optically coupled to six viewing ports 36 by fiber optic cables 86. As previously described, camera 38 may include a multiplexing system that enables camera 38 to scan an image from each viewing port 36 either sequentially or in parallel. Viewing ports 36 may be located along the length of combustor 16 in direction 48, and/or radially about its circumference. The location of each viewing port 36 may be determined by a region of interest within combustor 16. For example, in the embodiment depicted in FIG. 8, viewing ports 36 located closer to fuel nozzles 12 may be directed to flames 80, while viewing ports 36 located farther downstream may be configured to monitor combustor liner 56. In this manner, various regions of combustor 16 may be scanned by camera 38. Similarly, by positioning viewing ports 36 circumferentially around combustor 16, camera 38 may monitor different portions of flames 80 and/or combustor liner 56.

The present embodiment includes a single camera 38 optically coupled to combustor 16. Other embodiments may employ multiple cameras 38 per combustor 16. For example, viewing ports 36 located near fuel nozzles 12 may be optically coupled by fiber optic cables 86 to a first camera 38, while viewing ports 36 located farther downstream may be optically coupled by fiber optic cables 86 to a second camera 38. This alternative configuration may facilitate higher frame rates and/or greater scanning resolution. However, as appreciated, the additional camera 38 increases production costs. In other embodiments, fiber optic cables 86 from each combustor 16 within the turbine system may be optically coupled to a single camera 38. For example, if the turbine system includes ten combustors 16 and each combustor 16 includes six viewing ports 36, a total of sixty optical fibers 86 may extend from each viewing port 36 to a single camera 38. This configuration may decrease cost, but reduce frame rate and/or scanning resolution.

Figure 9:
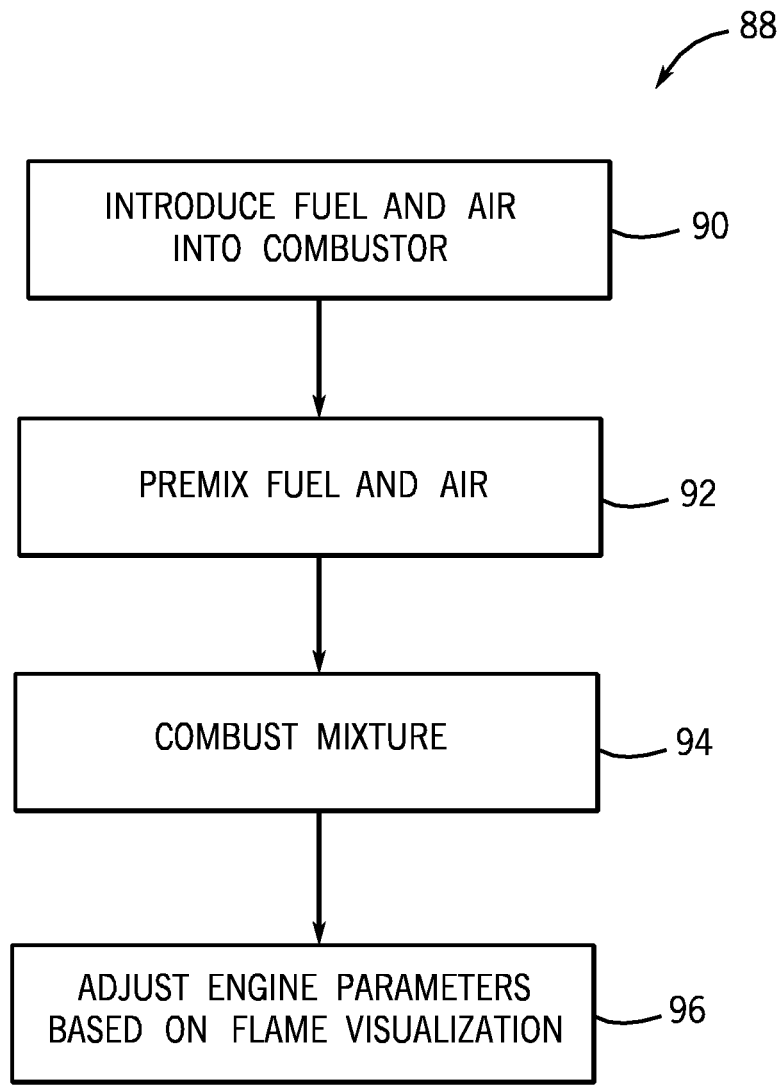
FIG. 9 is a flowchart of a method of combusting fuel and air, and adjusting engine parameters based on flame visualization in accordance with certain embodiments of the present technique.

FIG. 9 presents a flowchart of a method 88 of operating a turbine engine in accordance with certain disclosed embodiments. First, as represented by block 90, fuel and air are introduced into the combustor. The fuel and air are then premixed within the combustor, as represented by block 92. The fuel-air mixture is then combusted as it flows through the combustor, as represented by block 94. As represented by block 96, engine parameters are adjusted based on flame visualization. As previously discussed, flames may be visualized by a camera optically coupled to the combustor via a viewing port.

Figure 10A:
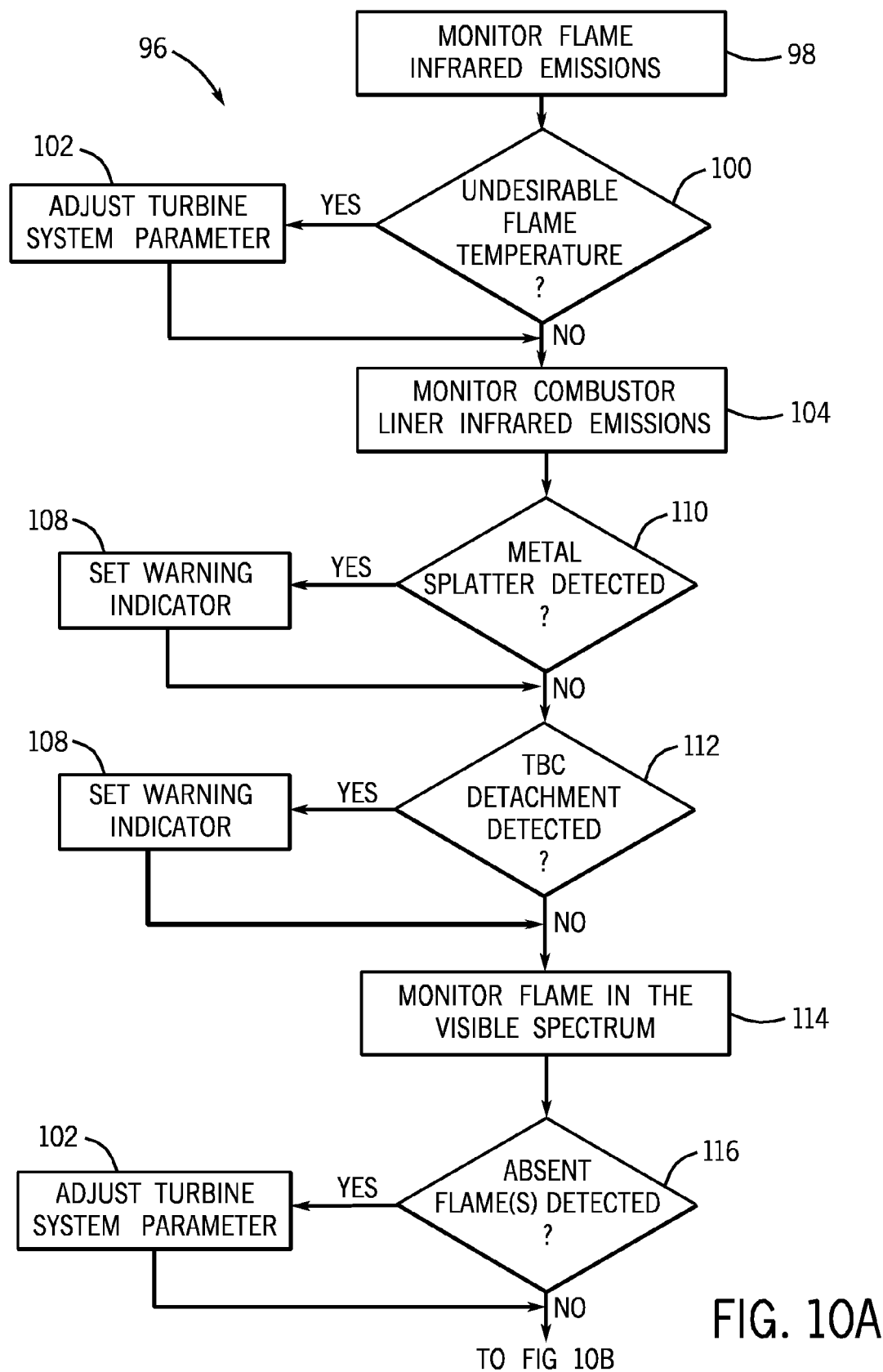
FIGS. 10A and B are a flowchart of a method of adjusting engine parameters based on flame visualization in accordance with certain embodiments of the present technique.
Figure 10B:
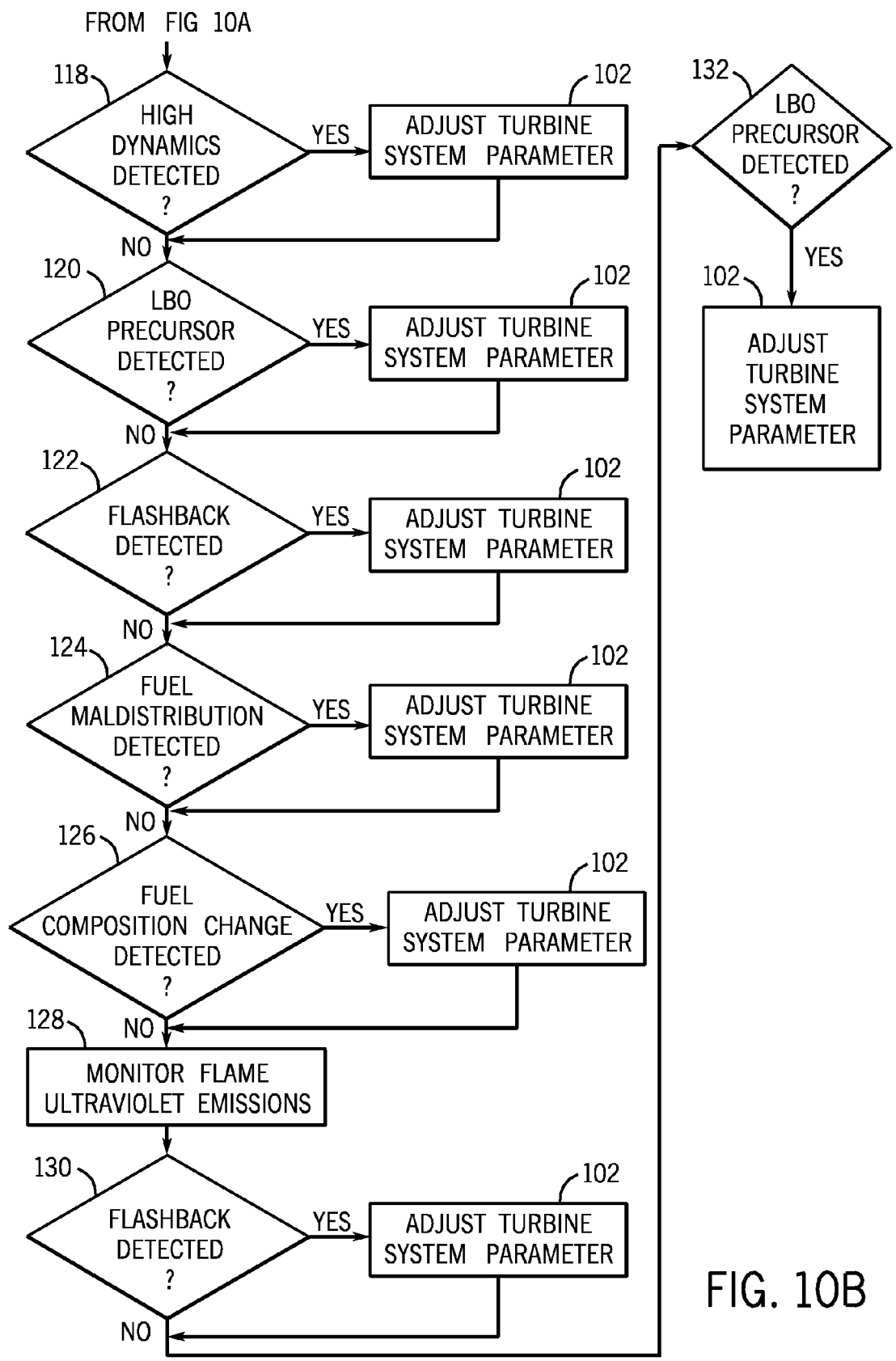

FIGS. 10A and B show a detailed flowchart of the steps preformed in block 96 of FIG. 9 in one embodiment. First, as represented by block 98, infrared emissions of the flame are monitored. As previously discussed, the camera may be configured to detect spectral emissions across a range of wavelengths, including visible, infrared and ultraviolet. Infrared emissions may be detected by including a filter within a camera lens system to attenuate every emission spectrum except for infrared. Such a filter facilitates monitoring and analysis of infrared emissions. Similarly, the controller may be configured to electronically analyze images received from the camera and filter out any wavelengths other than infrared. In other embodiments, the camera may only be sensitive to infrared emissions. Regardless of the technique for detecting infrared emissions, the controller may analyze the image to identify flame anomalies. As appreciated, temperature may be computed by observing the frequency and intensity of infrared emissions. Therefore, the controller may be configured to compute flame temperature based on detected infrared emissions. As represented by block 100, flame temperature is analyzed to determine whether it is proper for current combustor operating conditions. For example, improper flame temperature may result in increased emissions of oxides of nitrogen (NOx) and/or carbon monoxide (CO), among other combustion products. Because emissions of these gases are tightly regulated, ensuring proper flame temperature may effectuate compliance with emissions requirements. If the flame temperature is undesirable, the controller may adjust a turbine system parameter to compensate, as represented by block 102.

Proper flame temperature may be determined by a variety of methods. First, the temperature of one flame may be compared to other flames within an individual combustor. If one flame is burning at a substantially higher or lower temperature than the average flame temperature within the combustor, the controller may adjust fuel flow to the fuel nozzle associated with the anomalous flame. Similarly, the temperature of each flame may be compared to average flame temperature across the entire turbine system. As previously discussed, the turbine system includes multiple combustors. By comparing flame temperature across the entire turbine system, the controller may identify particular flames that are burning at undesirable temperatures. Alternatively, the controller may contain a database of proper flame temperatures for particular turbine configurations and/or operating conditions. The controller may then adjust fuel flow to individual fuel nozzles if flame temperature substantially deviates from the temperatures stored within this database.

As represented by block 104, infrared emissions from the combustor liner are monitored. As previously discussed, one camera may be configured to rotate and/or translate relative to a viewing port to view the flame and the combustor liner. Alternatively, multiple cameras may be coupled to the combustor to view different regions of the combustor. For example, a combustor may include two cameras, one directed toward the flame and the other directed toward the combustor liner. Similarly, two fiber optic cables may be optically coupled to the combustor, one directed to the flame and the other directed to the combustor liner. Each of these fiber optic cables may be connected to a single camera. In each of the above configurations, both the flame and the combustor liner are monitored.

As represented by block 110, the combustor liner may be monitored for metal splatter. Metal particles entering the combustor may melt and splatter as they impact the liner. Generally, such metal particles originate in the compressor section, and are indicative of compressor wear. If the size and/or frequency of the metal splatter indicates a compressor anomaly, the controller may set a warning indicator, represented by block 108, to inform an operator of the potential problem.

In addition, the controller may analyze the image of combustor liner infrared emissions to determine whether TBC detachment has occurred, as represented by block 112. TBC is a coating applied to the inside of the combustor to protect metal components from the extreme heat of combustion gasses. TBC may include ceramic tiles secured to the combustor liner and/or a ceramic coating sprayed onto the metal surfaces. For example, the sprayed coating may be composed of yttria-stabilized zirconia (YSZ). If the sprayed coating or ceramic tiles detach, or gaps form in the TBC, liner temperature may vary at the site of the defect. This temperature variation may be detected by monitoring infrared emissions of the combustor liner. If such a condition is identified, the controller may set a warning indicator, as represented by block 108, to inform an operator of the condition.

As represented by block 114, the flame is monitored in the visible spectrum. Similar to observing infrared emissions, the camera may monitor visible images by substantially attenuating infrared and ultraviolet wavelengths with a filter, or the controller may electronically filter out undesired wavelengths. Alternatively, the camera may be configured to detect only visible light. For example, the light detecting element (e.g., CCD) may only be sensitive to light from the visible spectrum.

As represented by block 116, the controller detects absent flame(s) within a combustor. As previously discussed, each fuel nozzle may produce an individual flame. A camera directed towards the fuel nozzles may be configured to observe the presence of these flames. An image of the flames is then transmitted to the controller, where absent flames are identified. If absent flames are detected, the controller may adjust a turbine system parameter to compensate, as represented by block 102.

As represented by block 118, the controller monitors visible light emissions from the flame to detect high dynamics. Air and fuel pressures within each combustor may vary cyclically with time. These fluctuations may drive a combustor oscillation at a particular frequency. If this frequency corresponds to a natural frequency of a part or subsystem within the turbine engine, damage to that part or the entire engine may result. Therefore, the controller is configured to monitor and compensate for high dynamic conditions. For example, under high dynamic conditions, the shape and/or size of each flame may vary with time, corresponding to the frequency of the combustor driven oscillations. The controller may identify a high dynamic condition by monitoring the shape and/or size of each flame over time. The camera (e.g., video camera) may be configured to scan images at a frame rate greater than the frequency of oscillation. For example, if the flame shape and/or size varies at a rate of 2000 Hz, the camera may be configured to scan images at 2000 frames per second to properly observe the variations. Otherwise, the controller may be unable to identify high dynamics based on images received at a lower frame rate. As represented by block 102, the controller may compensate for these dynamics by adjusting a turbine system parameter.

The controller may also identify LBO precursors by observing visible emissions of the flame, as represented by block 120. LBO is a condition in which the flame is extinguished because the fuel-air mixture becomes too lean. LBO may occur for an individual flame or every flame in the combustor. LBO precursors may include large magnitude, low frequency changes to flame shape and/or size, flame reaction products such as OH and/or movement of the flame relative to the fuel nozzle. If an LBO precursor is detected, the controller may adjust a turbine system parameter, as represented by block 102.

As represented by block 122, the controller determines whether the visible spectrum of the flame indicates a flashback/flame holding event. A flashback condition generally occurs when a flame travels upstream from the combustion zone of the combustor to the premixing zone. This condition is undesirable because the premixing zone may not be configured to tolerate the heat produced by the combustion reaction. Therefore, the controller may detect flame movement into the premixing zone and adjust a turbine system parameter to compensate, as represented by block 102.

Fuel maldistribution within the combustor is also detected, as represented by block 124. Fuel maldistribution may occur when fuel flow to certain fuel nozzles is greater than fuel flow to other fuel nozzles. For example, the fuel nozzles may be organized in a series of concentric rings within the combustor. The combustor may be configured to adjust fuel flow to each of these rings individually. In such an arrangement, fuel flow to an outer ring may be greater than fuel flow to an inner ring. Such an anomalous condition may be detected because the flames of the outer ringer are larger and/or brighter than the flames of the inner ring, for example. If the controller detects such a condition, the controller may reduce fuel flow to the outer ring and/or increase fuel flow to the inner ring, among other turbine system parameter adjustments, as represented by block 102.

As represented by block 126, changes to fuel composition are detected. For example, fuel may contain impurities which affect combustion. In addition, the mixture ratio of fuel and air may change over time. These conditions may be detected by the controller based on color variations among the flames, for example. If the controller detects that one flame in a combustor deviates from a desired color, the controller may adjust fuel flow to the respective nozzle to compensate. Similarly, if the color of every flame in a combustor varies from a desired color, the controller may adjust a turbine system parameter, as represented by block 102.

The camera may also monitor the flame for ultraviolet emissions, as represented by block 128. As previously discussed, the camera may be configured to detect a broad spectrum of wavelengths, such as visible, infrared and ultraviolet. In such a configuration, the camera may include a filter that attenuates all wavelengths except ultraviolet, such that the controller may receive an image of the flame in an ultraviolet spectrum. Similarly, the controller may receive a broad spectrum image of the flame and electronically filter out the non-ultraviolet wavelengths. In other embodiments, the camera imaging sensor is configured to detect only ultraviolet emissions.

As represented by block 130, the controller may detect a flashback event, as described above, by monitoring ultraviolet emissions of the flame. For example, a properly premixed combustion reaction within the combustion zone may emit ultraviolet radiation at approximately 300 nm. This emission may be the result of hydroxide (OH) ions produced within the flame. If the flame moves into the premixing zone, the flame may generate soot that emits ultraviolet radiation at approximately 350 nm to 450 nm. Therefore, if the frequency of ultraviolet emissions within the combustion zone shifts from approximately 300 nm to approximately 350 nm to 450 nm, a flashback event may have occurred. To compensate for flashback, the controller may adjust a turbine system parameter, as represented by block 102.

Ultraviolet emissions may also be used to detect LBO precursors, as represented by block 132. As previously discussed, a properly premixed flame may generate OH which emits ultraviolet radiation at approximately 300 nm. If the flame is extinguished, emissions of radiation at approximately 300 nm may drop to zero. One indication that LBO may occur is repeated short duration extinction events. The frequency of these extinction events may be proportional to the likelihood of LBO. Therefore, by measuring the frequency of the absence of 300 nm radiation, the controller may be able to predict an LBO event. To compensate for this condition, the controller may adjust a turbine system parameter, as represented by block 102.

Figure 11:
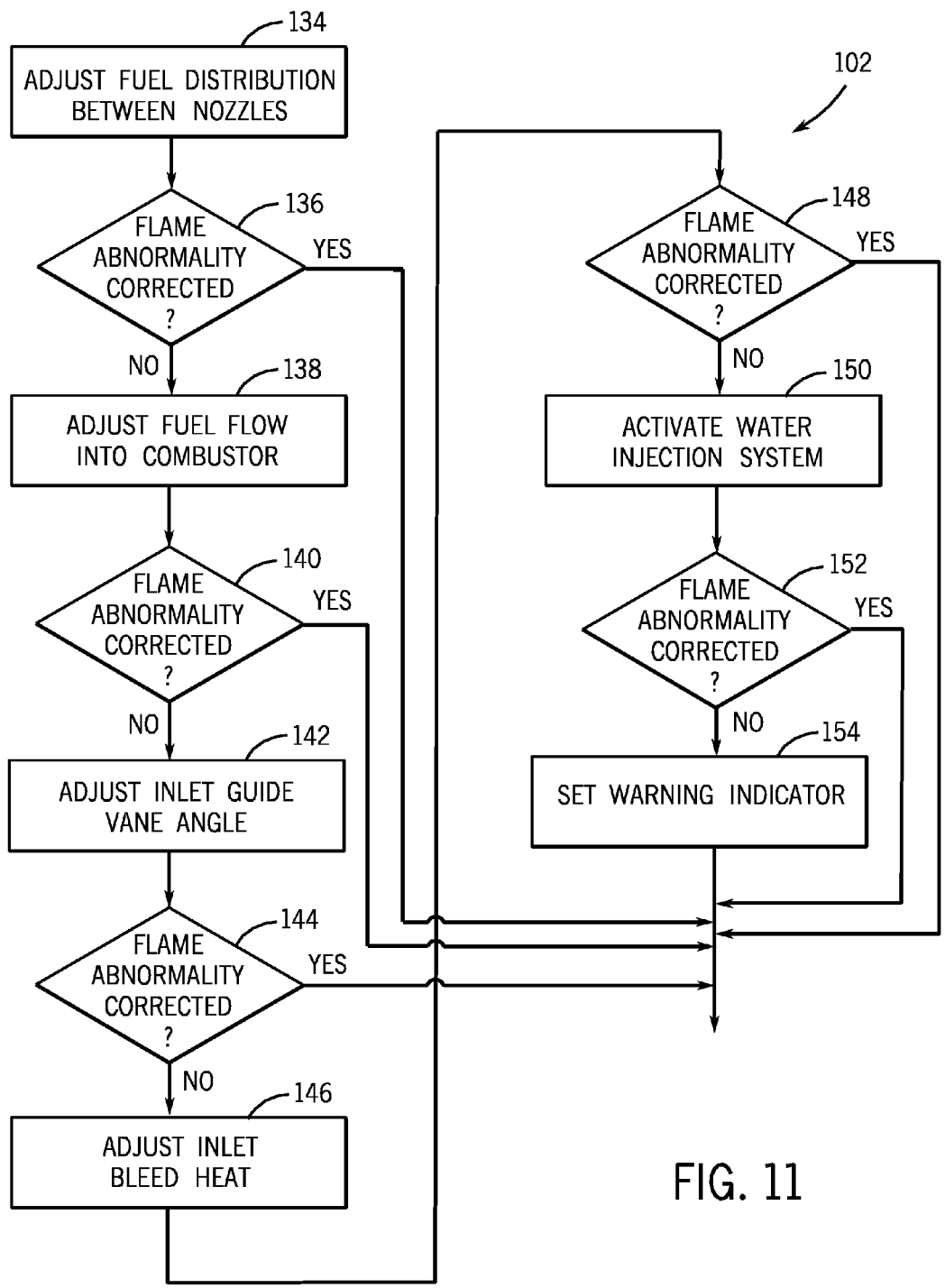
FIG. 11 is a flowchart of a method of adjusting fuel flow to the combustor in accordance with certain embodiments of the present technique.

FIG. 11 shows a detailed flowchart of the steps preformed in block 102 of FIGS. 10A and B in one embodiment. As represented by block 134, fuel distribution between nozzles is adjusted. As previously discussed, the fuel flow may be adjustable for each nozzle individually, or adjustable by groups of nozzles. For example, the nozzles may be organized in a series of concentric rings within the end cap of the combustor. Fuel flow to each ring may be adjusted independently. For example, the controller may increase fuel flow to an outer ring, while decreasing fuel flow to an inner ring. Similarly, the controller may adjust fuel flow to each nozzle individually. In addition, other nozzle configurations and groups may be implemented in alternative embodiments.

As represented by block 136, the controller determines whether redistribution of fuel within the combustor has corrected the flame abnormality. For example, if the controller determines that the flames near the center of the combustor are cooler than the flames towards the outside of the combustor, the controller may increase fuel flow to the fuel nozzles in the center. Similarly, if the controller determines flames are absent from the center of the combustor, the controller may increase fuel flow to the center fuel nozzles. If this technique fails to remedy the flame abnormality, the method proceeds to block 138.

As represented by block 138, fuel flow into the combustor is adjusted. For example, if high dynamics are detected among substantially all of the flames within the combustor, the controller may increase or decrease fuel flow to the particular combustor experiencing high dynamics. Similarly, if LBO precursors are detected among substantially all of the flames within the combustor, the controller may adjust fuel flow to the anomalous combustor. The controller may then determine whether this corrective measure has resolved the anomaly, as represented by block 140.

In certain embodiments, the controller is communicatively coupled to inlet guide vanes, an inlet bleed heat unit and/or a water injection system. These systems may be utilized to compensate for certain types of flame anomalies. Therefore, if adjusting fuel flow into the combustor fails to correct the anomaly, the controller adjusts inlet guide vane angle to compensate, as represented by block 142. If the controller determines that adjusting inlet guide vane angle has not resolved the anomaly, as represented by block 144, the controller adjusts inlet bleed heat, as represented by block 146. If the controller determines that adjusting inlet bleed heat has not resolved the anomaly, as represented by block 148, the controller activates the water injection system, as represented by block 150. The controller may then determine whether this corrective measure has resolved the anomaly, as represented by block 152.

If the anomaly has not been corrected, the controller sets a warning indicator, as represented by block 154. The warning indicator may inform an operator of the detected condition within the turbine engine. For example, a control panel may include a series of indicators representing various conditions previously described. Upon detection, the controller may illuminate the indicator indicative of the detected condition. The operator may then take appropriate remedial measures, including adjusting engine parameters or deactivating the engine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising: a turbine engine, comprising: a combustion chamber that houses a flame while the turbine engine is in operation; a viewing port into the combustion chamber; a camera configured to obtain an image, or series of images, of the flame in the combustion chamber through the viewing port; and a controller configured to receive the image, or series of images, from the camera, to analyze the image, or series of images, to identify at least one of flame temperature, flashback, flame holding, substantially excessive dynamic oscillations, changes to fuel composition, and lean blowout precursors based on the image, or series of images, and to adjust a parameter of the turbine engine based on at least one of the identified flame temperature, flashback, flame holding, substantially excessive dynamic oscillations, changes to fuel composition, and lean blowout precursors.

2. The system of claim 1, wherein the turbine engine comprises a turbine engine comprising a plurality of combustion chambers, and a corresponding plurality of cameras, wherein each camera is optically coupled to a respective combustion chamber, and each camera is communicatively coupled to the controller.

3. The system of claim 1, wherein the camera comprises a video camera.

4. The system of claim 1, wherein the camera comprises an imaging sensor configured to detect at least one of visible, infrared and ultraviolet wavelengths.

5. The system of claim 1, wherein the camera is optically coupled to the viewing port by a fiber optic cable.

6. The system of claim 1, wherein the combustion chamber comprises a plurality of viewing ports, and wherein at least one camera is configured to obtain an image of the flame in the combustion chamber through the viewing ports.

7. The system of claim 1, comprising a positioning mechanism coupled to the camera, wherein the positioning mechanism enables the camera is configured to rotate relative to the viewing port, to translate relative to the viewing port, or a combination thereof.

8. The system of claim 1, wherein the parameter of the turbine engine comprises fuel flow rate to the combustion chamber.

9. The system of claim 1, comprising a plurality of fuel nozzles within the combustion chamber, and wherein the parameter of the turbine engine comprises fuel distribution to the plurality of fuel nozzles within the combustion chamber.

10. The system of claim 1, wherein the parameter of the turbine engine comprises inlet guide vane angle, inlet bleed heat, water injection system activation status, or a combination thereof.

11. A system, comprising: a camera configured to view and capture an image, or series of images, of an interior of a combustion chamber; a controller configured to receive and analyze the image, or series of images, of the interior of the combustion chamber from the camera, and to control a parameter affecting combustion in the combustion chamber based on the image~ or series of images; wherein the image, or series of images, includes infrared emissions of a solid surface within the combustion chamber, and the controller is configured to set a warning indicator based on the image, or series of images, of infrared emissions of an interior liner of the solid surface within the combustion chamber.

12. The system of claim 11, wherein the image, or series of images, includes at least one of visual, infrared, and ultraviolet emissions of a flame within the combustion chamber, and the controller is configured to control the parameter affecting combustion based on the emissions of the flame image, or series of images, of a flame within the combustion chamber.

13. The system of claim 11, wherein the image, or series of images, is indicative of flame presence, flashback, or a combination thereof, and the controller is configured to control the parameter affecting combustion based on the image, or series of images, indicative of flame presence, flashback, or a combination thereof.

14. The system of claim 11, wherein the image, or series of images, is indicative of substantially excessive dynamic oscillations, fuel maldistribution, changes to fuel composition, lean blowout precursors, or a combination thereof, and the controller is configured to control the parameter affecting combustion based on the image, or series of images, indicative of substantially excessive dynamic oscillations, fuel maldistribution, changes to fuel composition, lean NOV, TOUt precursors, or a combination thereof.

15. The system of claim 14, wherein the parameter affecting combustion comprises fuel flow rate to the combustion chamber, fuel distribution to a plurality of fuel nozzles within the combustion chamber, inlet guide vane angle, inlet bleed heat, water injection system activation status, or a combination thereof.

16. The system of claim 11, wherein the solid surface is coated with a thermal barrier coating, and wherein the controller is configured to set the warning indicator upon detection of metal splatter on the solid surface, thermal barrier coating detachment from the solid surface, or a combination thereof.

17. The system of claim 11, wherein the solid surface comprises an interior liner of the combustion chamber.

* * * * *